United States Patent [19]

Steinke

[11] Patent Number: 4,495,814
[45] Date of Patent: Jan. 29, 1985

[54] ACCELEROMETER PENDULUM SUPPORT ASSEMBLY

[75] Inventor: Kurt E. Steinke, Bellevue, Wash.

[73] Assignee: Sundstrand Data Control, Inc., Redmond, Wash.

[21] Appl. No.: 393,015

[22] Filed: Jun. 28, 1982

[51] Int. Cl.³ .............................................. G01P 15/00
[52] U.S. Cl. .................................. 73/514; 73/517 B; 384/428
[58] Field of Search ................ 73/514, 516 R, 517 B; 384/220, 223, 428; 74/5 F

[56] References Cited

U.S. PATENT DOCUMENTS

| | | | |
|---|---|---|---|
| 4,131,020 | 12/1978 | Hugli et al. | 73/517 B |
| 4,169,384 | 10/1979 | Flanner et al. | 73/517 B |
| 4,249,420 | 2/1981 | Marquess | 73/516 R |

Primary Examiner—Jerry W. Myracle
Assistant Examiner—John E. Chapman, Jr.
Attorney, Agent, or Firm—Michael B. McMurry; Ted E. Killingsworth; Harold A. Williamson

[57] ABSTRACT

In order to provide for accurate setting of a preload force on an accelerometer force responsive pendulum and to provide for rigid support for the pendulum, a pendulum support assembly is constructed with a flexure member that is attached at one end to the accelerometer frame. The flexure receives the preload force from a preload pin at the other end and has one pendulum axle bearing attached to it between the attachment point and the preload pin. In addition, the flexure includes a hinge portion located next to the attachment point that serves to make the flexure a statically determinate beam so that the preload force on the bearing can be accurately determined.

12 Claims, 3 Drawing Figures

ACCELEROMETER PENDULUM SUPPORT ASSEMBLY

BACKGROUND OF THE INVENTION

The invention relates to the field of accelerometers and more particularly to an assembly for supporting a force sensing pendulum in an accelerometer.

It has been a continuing problem in the design of accelerometers that use pivotally supported, force responsive pendulums to provide a support assembly that minimizes rotational friction while at the same time providing rigid support for the pendulum so that lateral movement of the pendulum with respect to the support frame of the accelerometer is eliminated insofar as possible. For accurate calibration of this type of accelerometer it is necessary that the optimum pressure or preload be applied through the bearing rotationally supporting the pendulum so as to minimize rotational friction while providing adequate lateral support of the pendulum. Sufficient lateral support of the pendulum is necessary in order to insure that the pendulum is properly aligned within the accelerometer and that wear is minimized in the bearing that provides rotational support for the pendulum.

In prior art accelerometer flexure assemblies, as illustrated by U.S. Pats. to Clark Nos. 3,246,525 and to Hugli et al 4,131,020, there has not been a really effective way of accurately adjusting the preload force on the flexure or flexures supporting the bearings that in turn support the pendulum axles. In Clark U.S. Pat. No. 3,246,525 for example, two cantilevered flexures or supports are provided wherein the contact pressure on the pendulum pivot pins is set by varying the spring stiffness of the flexures. Aside from the apparent inaccuracies in such a procedure, the flexure assembly shown in Clark U.S. Pat. No. 3,246,525 is subject to alignment errors as well as potential problems from vibration resulting from the natural resonant frequency of the two cantilevered flexures. In Hugli et al U.S. Pat. No. 4,131,020 a single flexure is clamped at both ends with the preload being set by a screw thereby making it difficult to directly determine the preload force on the flexure. In this arrangement the preload is typically determined indirectly by measuring friction torque or the play between pivot and bearing.

SUMMARY OF THE INVENTION

It is therefore an object of the invention to provide an accelerometer pendulum support assembly that includes a flexure secured at one end to the accelerometer support frame wherein the flexure includes a hinge portion and the assembly further includes a first bearing, adapted to receive one end of an axle attached to the pendulum, secured to said flexure; a preload member for applying a preload force to the flexure; and a second bearing supported by the support frame adapted to receive the other end of the pendulum axle.

It is a further object of the invention to provide an accelerometer pendulum support assembly that includes: a flexure having a first end attached to the accelerometer support frame with a hinge portion configured therein close to the first end; a preload member for applying a preload force to the flexure; a first bearing, adapted to receive one end of the axle of the pendulum, secured to the flexure between the hinge portion and the point where the preload force is applied to the flexure; and a second bearing, adapted to receive the other end of the pendulum axle, secured to the support frame.

It is an additional object of the invention to provide a method for applying a predetermined preload force on a support axle of a force responsive pendulum of an accelerometer that also includes a flexure secured at one end to the accelerometer support frame, a preload member abutting the flexure, a first bearing secured to the flexure adapted to receive one end of the pendulum support axle, and a second bearing supported by the support frame adapted to receive the other axle of the pendulum wherein the method includes the steps of: applying a predetermined force to the preload members;

securing the preload member to the support frame; and removing the preload force.

DETAILED DESCRIPTION OF THE INVENTION

Figure 1:
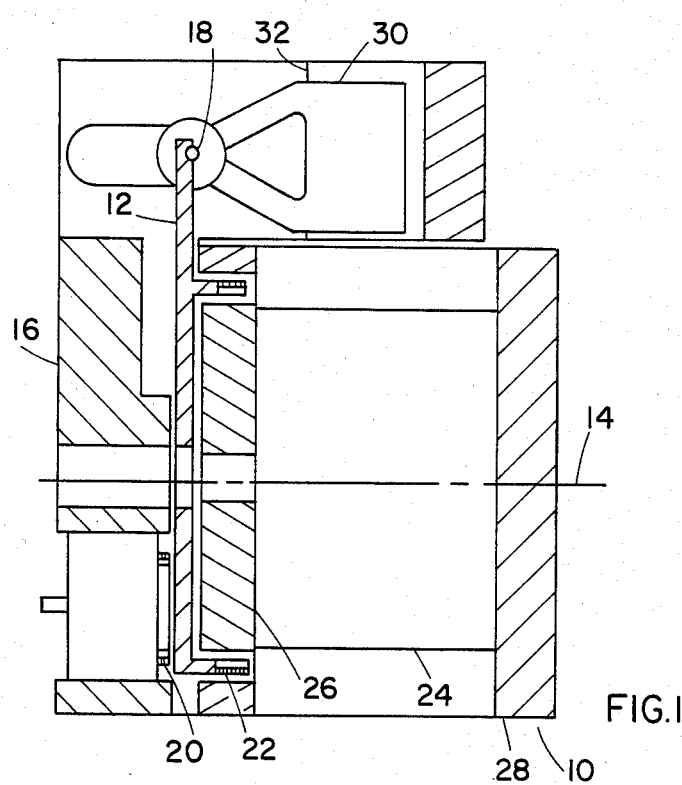
FIG. 1 is a sectional side view of an accelerometer.

In FIG. 1 is illustrated is sectioned form the most significant components of a servoed accelerometer 10. This type of accelerometer is well known in the art and representative examples are disclosed in detail in U.S. Pat. Nos. 3,176,521, 3,246,525 and 4,131,020. In this type of accelerometer, a pendulum 12 responds to an acceleration force along an axis 14 by rotating with respect to the accelerometer support frame 16 about a pivot point 18. Rotation of the pendulum 12 is detailed by a pick-off coil 20 and a restoring force is applied to the pendulum 12 by means of a torque coil 22 interacting magnetically with a permanent magnet 24, a pole piece 26 and a magnetic return path 28.

Figure 2:
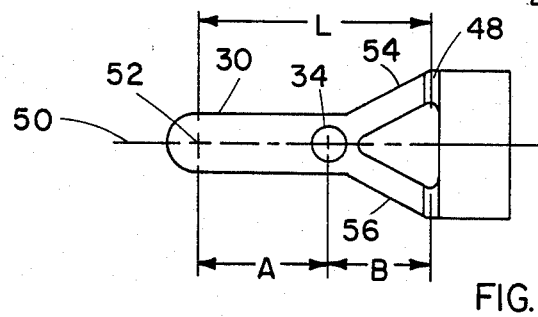
FIG. 2 is a drawing of a pendulum support flexure.
Figure 3:
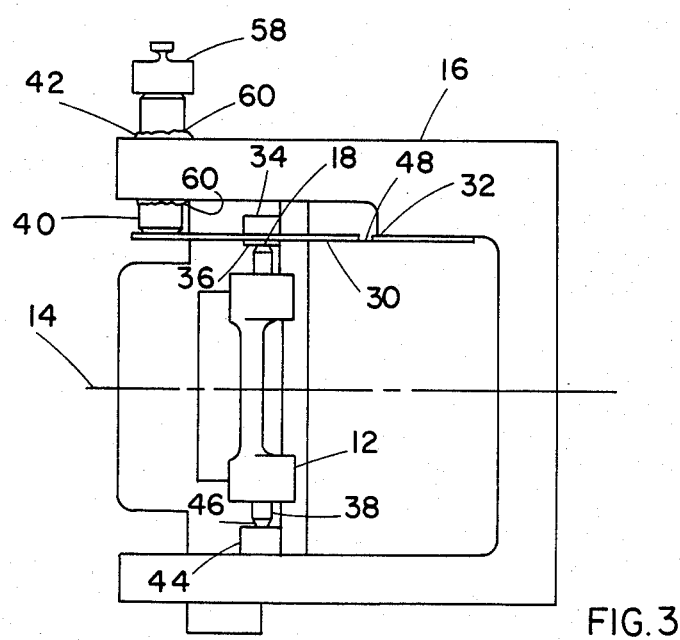
FIG. 3 is a top view of the accelerometer of FIG. 1.

Secured to the support frame 16 is a flexure member 30 as shown in FIGS. 2 and 3 as well as FIG. 1. As can be seen from FIG. 3, one end of the flexure 30 is attached to the support frame 16 along an edge 32 of the support frame 16. Secured to the flexure 30 is a first bearing 34 that is adapted to receive a first pivot 36 on one end of an axle 38 attached to the pendulum 12. Toward the other end, the flexure 30 is abutted by a preload pin 40 which extends through an aperture 42 in the support frame 16. Also secured directly to the support frame 16 is a second bearing 44 that is adapted to receive a second pivot 46 on the other end of the axle 38.

In responding to acceleration forces along the sensitive axis 14, the pendulum will tend to rotate about the pivot point 18 with the pivots 36 and 46 rotating in the bearings 34 and 44. To optimize the performance of the accelerometer, the pendulum suspension system must be sufficiently rigid to maintain alignment of the pivots 36 and 46 in the bearings 34 and 44 but at the same time the force of the bearings 34 and 44 on the axle 38 must not be so great as to cause errors resulting from excess bearing breakaway torque. As a result, one of the purposes of the flexure 30 and the preload pin 40 is to apply the desired level of preload pressure or force on the pivots 36 and 46 of the axle 38. To that end, the flexure 30 as shown in FIGS. 2 and 3 is provided with a hinge portion 48 close to the end of the flexure 30 attached to the support frame 16. One of the effects of the hinge 48 is to allow the flexure to be treated as a statically determinate beam thereby making it possible to accurately apply a predetermined preload force through the bearing 34 to the axle 38. In the flexure 30 as shown in FIGS. 2 and 3 with a section modulus constant along the axis 50 of the flexure 30 and where the distance A between the point 52 where the preload force is applied by the preload pin 40 and the bearing 34 is equal to the distance B between the bearing 34 and the hinge 48, the preload force applied to the bearing 34 by the flexure 30 will be twice the force applied to the flexure 30 at point 52 by the preload pin 40.

In the preferred embodiment of the flexure 30 as shown in FIG. 2 the triangularly shaped portion of the flexure 30 including legs 54 and 56 provides greater structural rigidity for the flexure in the axis perpendicular to the flexure axis 50. But, since the width of the legs 54 and 56 are equal and because the sum of the widths equals the width of the flexure between the bearing 34 and point 52, the section modulus of the flexure 30 will be symmetrical about the bearing 34.

Another advantage of the flexure shown in FIG. 2 where $A=B=L/2$ in that the deflection of the flexure at bearing 34 will be substantially translational thereby preserving the alignment of the bearing 34 with the pivot 36. Since in the preferred embodiment of the invention shown in FIG. 3 the other bearing 44 is firmly attached to the frame 16 the alignment of the bearing 44 with the pivot 46 will also remain substantially constant and the preload force on the axle 38 will be completely governed by the preload pin 40. It should be noted that translational movement of the bearing 34 in the type of arrangement shown in FIG. 3 can be achieved with the bearing 34 located somewhere other than at $L/2$ but this would require varying the section modulus of the flexure 30 along the flexure axis 50.

One particular advantage of the pendulum suspension assembly shown in FIG. 3 is that it permits very accurate setting of the preload. The preferred method for setting the preload is to place the preload pin 40 in the aperature 42 and then to place a weight 58 on the pin 40 such that it is pressing downwardly as shown. In combination with the weight of the pin 40, the weight 58 represents the desired preload force on the flexure 30. Then an epoxy material 60 is allowed to dry around the pin 40 securing it in place. The weight 58 is then removed and the desired preload is then set with respect to the pendulum.

I claim:

1. A support assembly for pivotally supporting a force responsive pendulum having an axle in an accelerometer having a support frame comprising:
    a flexure member having first and second ends, and secured in a cantilevered manner with said first end secured to the accelerometer support frame wherein said flexure member is configured with a hinge portion and a statically determinate beam portion;
    a first bearing secured to said flexure member adapted to receive one end of the pendulum axle;
    preload means for applying a preload force to the beam portion of said flexure member; and
    a second bearing adapted to receive the other end of the pendulum axle, and
    means for supporting said second bearing with respect to the accelerometer support frame.

2. The support assembly of claim 1 wherein said hinge portion is configured in said flexure member close to said end secured to the support frame.

3. The support assembly of claim 2 wherein said preload means applies said preload force toward said second end of said flexure member and said first bearing is secured between said preload means and said hinge portion such that said first bearing moves in a substantially translational manner with respect to the pendulum axle.

4. The support assembly of claim 3 wherein said first bearing is secured substantially midway between said hinge portion and said preload means on said flexure member.

5. The support assembly of claim 4 wherein the section modulus of said flexure member is substantially a constant value between said hinge portion and said preload means.

6. The support assembly of claim 5 wherein the portion of said flexure member between said hinge portion and said first bearing is substantially triangularly shaped and includes two leg members.

7. The support assembly of claims 1, 2, 3, 4, 5, or 6 wherein said preload means includes means for directly applying a predetermined preload force to said flexure member.

8. The support assembly of claims 1, 2, 3, 4, 5, or 6 wherein said second bearing support means includes means for directly attaching said second bearing to said support frame.

9. A support assembly for pivotally supporting a support axle of a force responsive pendulum in an accelerometer having a support frame comprising:
    a flexure member having first and second ends wherein said first end is secured to support frame and wherein said flexure member is configured with a reduced thickness across the width of said flexure member effective to serve as a hinge close to said first end;
    preload means for applying a preload force to said flexure member;
    a first bearing, adapted to receive one end of the pendulum axle, secured to said flexure member between said hinge and said preload means; and
    a second bearing, adapted to receive the other end of the pendulum axle, secured to the support frame.

10. The structure of claim 9 wherein said first bearing is located on said flexure member such that said first bearing moves in a substantially translational manner with respect to the pendulum axle.

11. The structure of claim 10 wherein said first bearing is located on said flexure member such that approximately twice as much preload force is applied by said first bearing to the pendulum axle as is applied by said preload means to said flexure member.

12. The structure of claims 9, 10 or 11 wherein said preload means includes a preload member secured to the support frame and abutting said flexure member.

* * * * *